(12) United States Patent
Younes et al.

(10) Patent No.: US 11,141,706 B2
(45) Date of Patent: Oct. 12, 2021

(54) SUPERCRITICAL WATER AND AMMONIA OXIDATION SYSTEM AND PROCESS

(71) Applicant: Saudi Arabian Oil Company, Dhahran (SA)

(72) Inventors: Mourad Younes, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 49 days.

(21) Appl. No.: 16/750,827

(22) Filed: Jan. 23, 2020

(65) Prior Publication Data
US 2021/0229054 A1    Jul. 29, 2021

(51) Int. Cl.
*B01J 3/00* (2006.01)
*C10G 53/14* (2006.01)
(Continued)

(52) U.S. Cl.
CPC ............ *B01J 3/008* (2013.01); *B01D 9/0059* (2013.01); *B01D 11/0488* (2013.01); *B01D 17/0208* (2013.01); *B01J 19/0006* (2013.01); *B01J 19/0013* (2013.01); *B01J 19/245* (2013.01); *B01J 19/2445* (2013.01); *C10G 53/02* (2013.01); *C10G 53/14* (2013.01); *B01J 2219/0004* (2013.01); *B01J 2219/00038* (2013.01); *B01J 2219/00103* (2013.01);
(Continued)

(58) Field of Classification Search
None
See application file for complete search history.

(56) References Cited

U.S. PATENT DOCUMENTS

| 4,719,000 A | 1/1988 | Beckberger |
| 5,558,783 A * | 9/1996 | McGuinness ........... C02F 1/008 210/761 |

(Continued)

OTHER PUBLICATIONS

International Search Report and Written Opinion in corresponding international patent application PCT/US21/14323, dated Apr. 13, 2021. 11 pages.
(Continued)

*Primary Examiner* — Tam M Nguyen
(74) *Attorney, Agent, or Firm* — Leason Ellis LLP

(57) ABSTRACT

The present application provides systems and methods for upgrading an oil stream. The system includes a reactor, a phase separator, an expansion device, a cooling unit, and two separation units. The reactor receives the oil stream, ammonia, and supercritical water. The supercritical water upgrades the oil stream, and the ammonia reacts with sulfur initially present in the oil stream to produce ammonia-sulfur compounds. The phase separator receives a mixture stream comprising the upgraded oil stream, supercritical water, and the ammonia-sulfur compounds, and separates out non-dissolved components. The expansion device reduces the pressure of the mixture stream below a water critical pressure. The cooling unit reduces the temperature of the mixture stream. A first separation unit separates the mixture stream it into a hydrocarbon-rich gaseous phase, a water stream containing ammonia-sulfur compounds, and a treated oil stream. A second separation unit separates the ammonia-sulfur compounds from the water stream.

10 Claims, 2 Drawing Sheets

Figure 1:
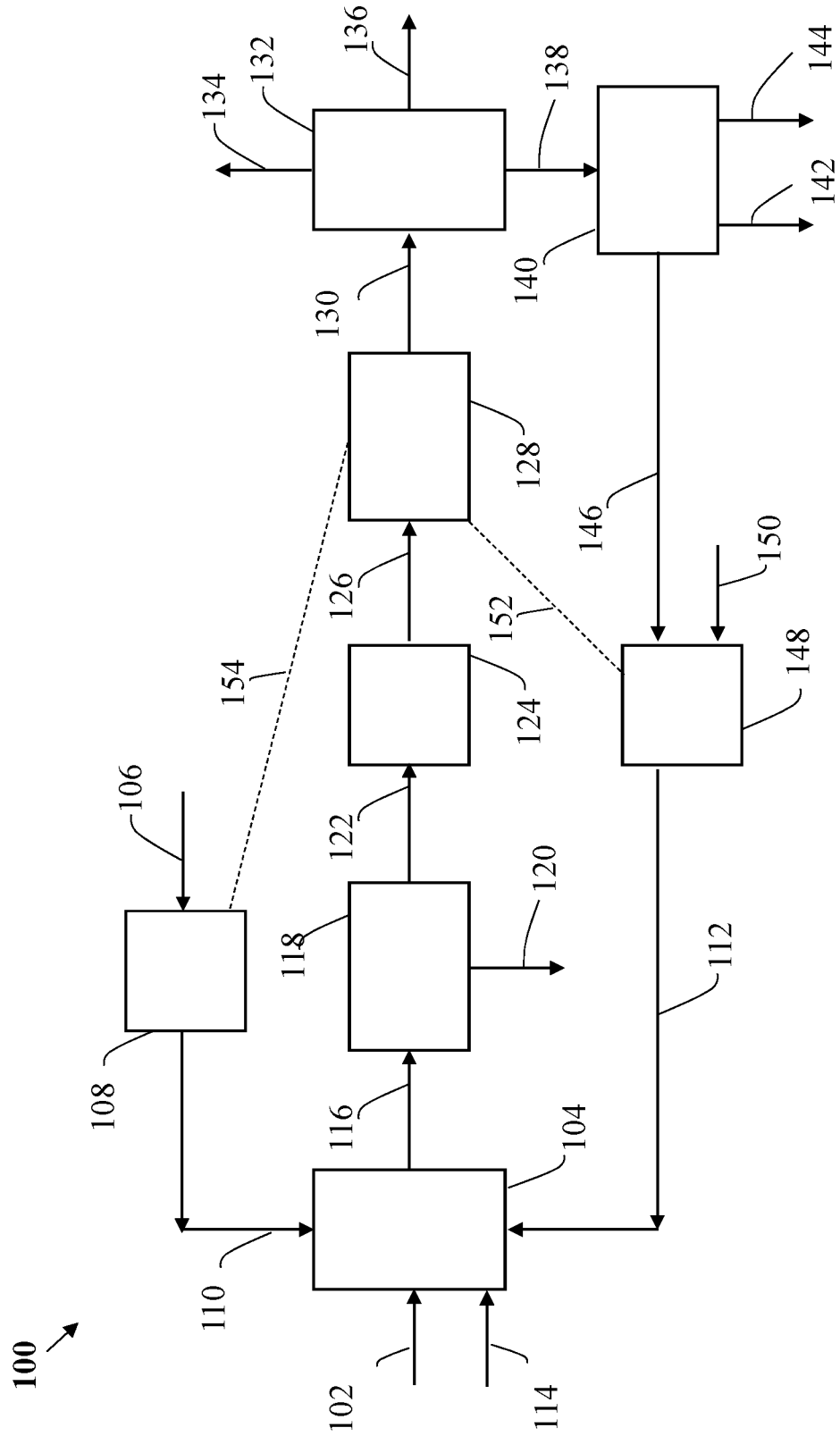

(51) Int. Cl.

| | | |
|---|---|---|
| *B01J 19/00* | (2006.01) | |
| *B01J 19/24* | (2006.01) | |
| *B01D 17/02* | (2006.01) | |
| *B01D 11/04* | (2006.01) | |
| *B01D 9/00* | (2006.01) | |
| *C10G 53/02* | (2006.01) | |

(52) U.S. Cl.
CPC ............... *B01J 2219/00159* (2013.01); *B01J 2219/00162* (2013.01); *C10G 2300/202* (2013.01); *C10G 2300/207* (2013.01); *C10G 2300/405* (2013.01); *C10G 2300/4006* (2013.01); *C10G 2300/4012* (2013.01); *C10G 2300/70* (2013.01); *C10G 2300/805* (2013.01)

(56) References Cited

U.S. PATENT DOCUMENTS

| | | | |
|---|---|---|---|
| 8,535,518 | B2 | 9/2013 | Choi et al. |
| 8,864,978 | B2 | 10/2014 | Choi |
| 9,382,485 | B2 | 7/2016 | Choi et al. |
| 9,914,885 | B2 | 3/2018 | Choi et al. |
| 9,926,497 | B2 | 3/2018 | Choi et al. |
| 2012/0055843 | A1 | 3/2012 | Bourane et al. |
| 2013/0206645 | A1* | 8/2013 | Yarbro ............... C10G 53/14 208/106 |
| 2014/0251871 | A1 | 9/2014 | Choi |
| 2016/0145502 | A1 | 5/2016 | Koseoglu |
| 2018/0142169 | A1 | 5/2018 | Pfeil |
| 2018/0171240 | A1 | 6/2018 | Choi et al. |
| 2020/0263096 | A1* | 8/2020 | Lynn ............... C10G 45/02 |

OTHER PUBLICATIONS

Miller, S. Falcone, and B.g. Miller. "Advanced Flue Gas Cleaning Systems for Sulfur Oxides (SO x ), Nitrogen Oxides (NO x ) and Mercury Emissions Control in Power Plants." Advanced Power Plant Materials, Design and Technology, 2010, pp. 187-216., doi:10.1533/9781845699468.2.187.

"Ammonia Based Desulfurization." Sep. 12, 2018. Jiangnan Environmental Technology, Inc. Accessed at: https://www2.illinois.gov/epa/public-notices/Documents/Ammonia%20Based%20Desulferization.pdf. 36 pages.

Helling, Richard K., and Jefferson W. Tester. "Oxidation of Simple Compounds and Mixtures in Supercritical Water: Carbon Monoxide, Ammonia and Ethanol" Environmental Science & Technology, vol. 22, No. 11, 1988, pp. 1319-1324., doi:10.1021/es00176a012.

Timko, Michael T., et al. "Upgrading and Desulfurization of Heavy Oils by Supercritical Water" The Journal of Supercritical Fluids, vol. 96, 2015, pp. 114-123., doi:10.1016/j.supflu.2014.09.015.

Zhang, Jie, et al. "Supercritical Water Oxidation of Ammonia with Methanol as the Auxiliary Fuel: Comparing with Isopropanol." Chemical Engineering Research and Design, vol. 147, 2019, pp. 160-170., doi:10.1016/j.cherd.2019.05.010.

* cited by examiner

SUPERCRITICAL WATER AND AMMONIA OXIDATION SYSTEM AND PROCESS

TECHNICAL FIELD

The present disclosure is generally related to systems and processes for upgrading oil and more particularly related to systems and processes for upgrading an oil stream via a supercritical water stream and desulfurizing the oil stream in-situ in conjunction with ammonia.

BACKGROUND OF THE DISCLOSURE

As climate change concerns continue to increase, additional regulations are being implemented across the globe to reduce pollution and greenhouse gas emissions. For example, the 2020 International Maritime Organization Sulfur regulations have been introduced, which cap the sulfur content in marine fuel to 0.5%. Other regulations have mandated the installation of abatement technologies such as scrubbers for the safe disposal of sulfur compounds and carbon dioxide.

Different processes are employed in the oil industry for upgrading oil-based streams and crude oil streams, such as supercritical water treatments. Supercritical water treatments of crude oil usually improve the crude oil quality and also tend to reduce some of its sulfur content. However, supercritical water treatments are not enough to reduce the sulfur content of crude oil to meet the current market needs. As such, additional sulfur removal technologies are generally used downstream of the supercritical water treatment. These technologies can include hydro-processing technologies, hydro-treating processes or oxidative sulfur removal processes. While these downstream sulfur removal technologies are generally effective, they significantly increase the treatment costs for the crude oil and require additional, expensive equipment.

The present application addresses these and other challenges related to upgrading and desulfurizing oil-based streams.

SUMMARY OF THE DISCLOSURE

The present application provides systems and methods for upgrading an oil stream. In a first aspect, the system includes a reactor configured to receive the oil stream, an ammonia stream, and a supercritical water stream, and configured to operate at supercritical water conditions. The supercritical water stream contacts the oil stream in the reactor, and thereby upgrades the oil stream, and the ammonia stream reacts with sulfur initially present in the oil stream to produce ammonia-sulfur compounds. The system also includes a phase separator fluidly connected to the reactor. The phase separator is configured to receive a mixture stream comprising the upgraded oil stream, supercritical water, the ammonia-sulfur compounds, and unreacted ammonia from the reactor. The phase separator is also configured to separate out any non-dissolved components from the mixture stream.

The system further includes an expansion device fluidly connected to the phase separator and configured to receive the mixture stream from the phase separator. The expansion device is further configured to reduce the pressure of the mixture stream below a water critical pressure to produce a low-pressure mixture stream. The system also includes a cooling unit fluidly connected to the expansion device and configured to receive the low-pressure mixture stream from the expansion device. The cooling unit is configured to reduce the temperature of the low-pressure mixture stream to create a low-pressure, low-temperature mixture stream.

The system also includes a first separation unit fluidly connected to the cooling unit and configured to receive the low-pressure, low-temperature mixture stream, wherein the first separation unit is further configured to separate the low-pressure, low-temperature mixture stream into a hydrocarbon-rich gaseous phase, a water stream containing ammonia-sulfur compounds, and a treated oil stream. The system further includes a second separation unit fluidly connected to the first separation unit and configured to receive the water stream from the first separation unit. The second separation unit comprises a crystallizer configured to crystallize and separate the ammonia-sulfur compounds from the water stream.

In another aspect, the reactor is configured to operate in a first mode at pressure of approximately 220 bar to 500 bar and a temperature of approximately 380° C. to 550° C., where there is no ammonia decomposition or minimal ammonia decomposition in the reactor, or the reactor is configured to operate in a second mode at pressure of approximately 220 bar to 500 bar and a temperature of approximately 550° C. to 800° C., where ammonium decomposition occurs in the reactor. In a further aspect, the reactor comprises a first section and a second section, such that the first section is operated in the first mode and wherein the second section is operated in the second mode. In a further aspect, the first section and the second section of the reactor operated in series or in parallel.

In another aspect, the reactor comprises a first thermal oxidation section configured to operate without a catalyst and in a temperature range of approximately 380° C. to 600° C., and a second thermal oxidation section configured to operate with a catalyst and in a temperature range of approximately 300° C. to 600° C. The first thermal oxidation section and the second thermal oxidation section are operated in series.

In another aspect, the reactor is further configured to receive an oxidant stream and the oxidant stream oxidizes a portion of the sulfur present in the oil stream and a portion of the ammonia-sulfur compounds. The oxidant stream enhances at least one of upgrading of the oil stream and oxidation of the ammonia-sulfur compounds.

In another aspect, the system further includes a compression unit fluidly connected to the second separation unit and the reactor. The compression unit is configured to receive the water stream from the second separation unit and a make-up water stream. The compression unit is also configured to mix the water stream and the make-up water stream to form a combined water stream. The compression unit is further configured to compress and heat the combined water stream to form the supercritical water stream. In a further aspect, the system includes an ammonia compression device configured to compress and heat the ammonia stream upstream of the reactor. The ammonia compression unit is configured to feed the ammonia stream to the reactor. Further, the expansion device includes one or more turbines that are mechanically linked to the at least one of the compression unit and the ammonia compression unit.

In another aspect, the system includes a heating unit fluidly connected to the reactor and configured to receive the ammonia stream and heat the ammonia stream prior to its delivery to the reactor.

In another aspect, the second separation unit is configured to separate the ammonia-sulfur compounds via centrifugation.

In another aspect, the cooling unit comprises at least one internal heat exchanger, and the at least one internal heat exchanger shares a thermal linkage with at least one of the compression unit and the heating unit. The at least one internal heat exchanger is configured to reduce external energy required to heat at least one of the compression unit and the heating unit.

In a second aspect, a method for upgrading an oil stream is provided. In the method, the oil stream, an ammonia stream, and a supercritical water stream are combined in a reactor to form a mixture stream. The supercritical water stream contacts the oil stream in the reactor, thereby upgrading the oil stream, and the ammonia stream reacts with sulfur initially present in the oil stream to produce ammonia-sulfur compounds. Non-dissolved components are separated from the mixture stream in a phase separator. The mixture stream is then expanded in an expansion device, where expansion of the mixture stream reduces the pressure of the mixture stream below a water critical pressure to produce a low-pressure mixture stream. The low-pressure mixture stream is then cooled in a cooling unit to create a low-pressure, low-temperature mixture stream. The low-pressure, low-temperature mixture stream is separated in a first separation unit into a hydrocarbon-rich gaseous phase, a water stream containing ammonia-sulfur compounds, and a treated oil stream. The ammonia-sulfur compounds are separated in a second separation unit from the water stream.

In another aspect, the step of separating in the second separation unit includes crystallizing, via a crystallizer in the second separation unit, the ammonia-sulfur compounds and separating the ammonia-sulfur compounds from the water stream via precipitation or centrifugation.

In another aspect, the reactor is operated in a first mode at pressure of approximately 220 bar to 500 bar and a temperature of approximately 380° C. to 550° C. such that there is no ammonia decomposition or minimal ammonia decomposition in the reactor.

In another aspect, the reactor is operated in a second mode at pressure of approximately 220 bar to 500 bar and a temperature of approximately 550° C. to 800° C. such that ammonium decomposition occurs in the reactor.

In another aspect, the ammonia stream is heated in a heating unit prior to delivery of the ammonia stream to the reactor.

In another aspect, the water stream received from the second separation unit is mixed in a compression unit with a make-up water stream to form a combined water stream. The combine water stream is then compressed and heated in the compression unit to form the supercritical water stream. The supercritical water stream is then transferred to the reactor.

In another aspect, an oxidant stream is injected into the reactor. The oxidant stream oxidizes a portion of the sulfur in the oil stream and a portion of the ammonia-sulfur compounds, and the oxidant stream enhances the upgrading of the oil stream. In a further aspect, the oxidant stream comprises at least one of ozone, oxygen, and $H_2O_2$.

In another aspect, the reactor has a first thermal oxidation section and a second thermal oxidation section operated in series, and a catalyst is injected into the second thermal oxidation section.

In another aspect, the oil stream comprises crude oil.

BRIEF DESCRIPTION OF THE DRAWING FIGURES

Figure 2:
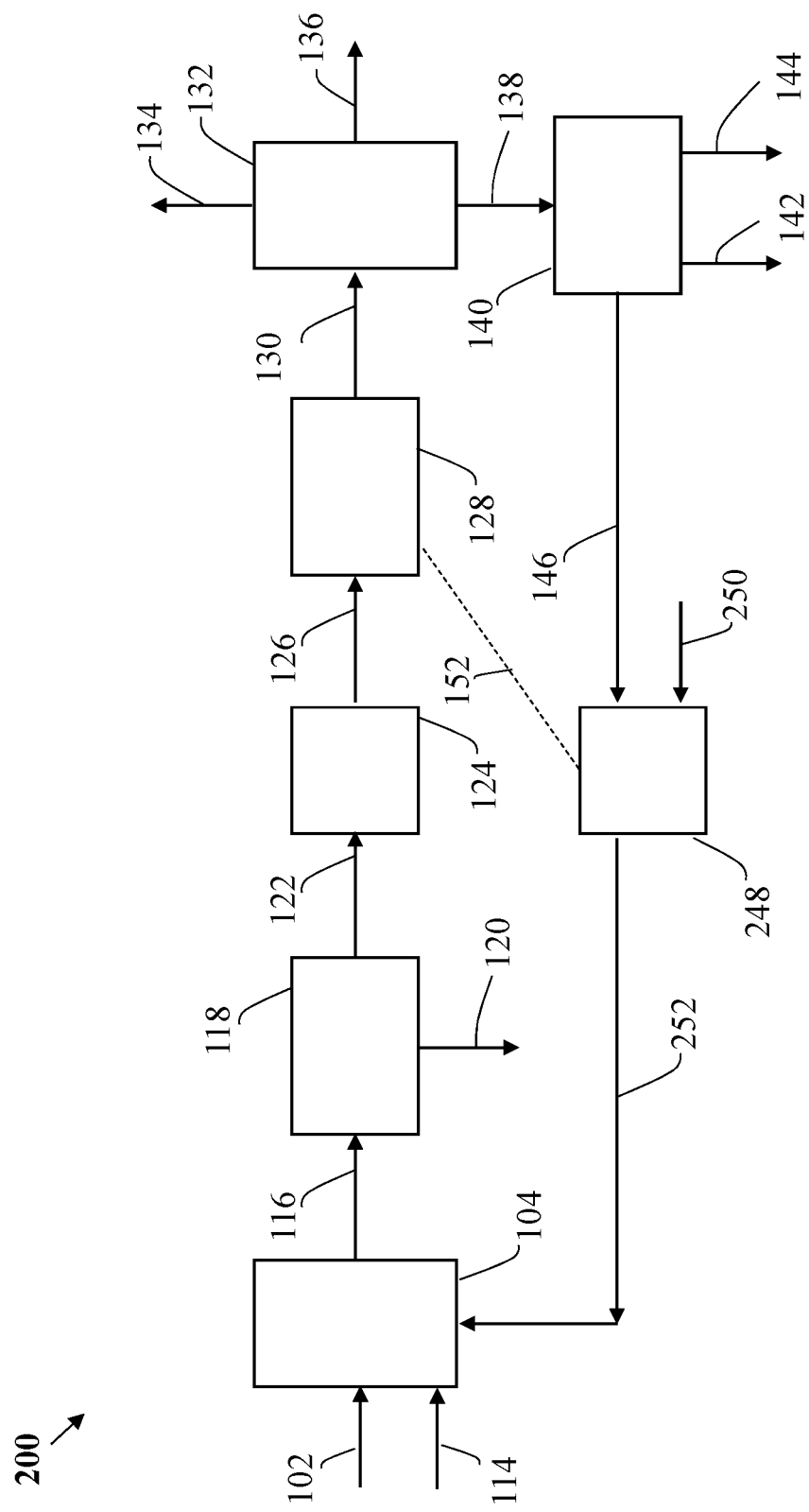

FIG. 1 shows a high-level diagram illustrating a system for upgrading an oil stream in accordance with one or more embodiments; and FIG. 2 shows a high-level diagram illustrating another system for upgrading an oil stream in accordance with one or more embodiment.

DETAILED DESCRIPTION OF CERTAIN EMBODIMENTS IN ACCORDANCE WITH THE DISCLOSURE

In accordance with one or more embodiments, the present application discloses systems and methods for upgrading oil streams via supercritical water oxidation. The present systems and methods also include in-situ desulfurization of oil streams using ammonia in supercritical water to capture sulfur radicals to produce ammonia-sulfur compounds, which are then extracted from the oil stream and water phase.

In one or more embodiments, the system includes a reactor that receives an oil stream, an ammonia stream, and a supercritical water stream. In the reactor, the supercritical water stream upgrades the oil stream, while the ammonia stream reacts with sulfur present in the oil stream to produce ammonia-sulfur compounds. A phase separator is used to separate out any non-dissolved components from the mixture stream of supercritical water, oil, and ammonia-sulfur compounds. An expansion device then reduces the pressure of the mixture stream below a water critical pressure, and a cooling unit reduces the temperature of the mixture stream to create a low-pressure, low-temperature mixture stream.

A first separation unit separates the low-pressure, low-temperature mixture stream into a hydrocarbon-rich gaseous phase, a water stream containing ammonia-sulfur compounds, and a treated oil stream. A second separation unit then separates the ammonia-sulfur compounds from the water stream. In at least one embodiment, the water stream can then be heated, compressed, and recycled to the reactor as supercritical water.

These and other aspects of the present systems and methods are described in further detail below with reference to the accompanied drawing figures, in which one or more illustrated embodiments and/or arrangements of the systems and methods are shown. The systems and methods of the present application are not limited in any way to the illustrated embodiment and/or arrangement. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods.

FIG. 1 shows a high-level diagram illustrating a system 100 for upgrading an oil stream in accordance with one or more embodiments. It should be understood that the various components of system 100 can be fluidly connected to one another via one or more tubes or conduits, for example, for transferring fluids. In the system 100, an oil stream is fed via conduit 102 to a reactor 104. The reactor 104 can be of any known type of reactor compatible with hydrothermal reactions such as vessel or tube reactors inclusive or not of a stirring technology. In one or more embodiments, the oil stream is a crude oil stream. In one or more embodiments, the oil stream comprises a measurable amount of sulfur.

In one or more embodiments, an ammonia stream is also fed to the reactor 104. The ammonia stream can include one or more ammonia-based compositions. For example, in one or more embodiments the ammonia stream can comprise one or more of anhydrous ammonia ($NH_3$), ammonia hydroxide ($NH_4OH$), and urea. In one more embodiments, the ammonia stream enters the reactor 104 as a high-pressure, high-temperature ammonia stream. As shown in FIG. 1, in one or more embodiments, the ammonia stream is first fed via conduit 106 to an ammonia compression unit 108 where the ammonia stream is compressed and, in certain embodiments, heated, to produce a high-pressure and optionally high-temperature ammonia stream. In one or more embodiments, the ammonia stream is compressed and heated to the temperature and pressure ranges of the reactor 104, as discussed in further detail below. In one or more embodiments, the molar flow of the ammonia stream can be 0.1 to 10 times the molar flow rate of the sulfur content in the oil stream 102. In at least one embodiment, the molar flow of the ammonia stream is in the range of 0.2 to 2 times the molar flow rate of the sulfur content in the oil stream. After compression and optional heating in the compression unit 108, the ammonia stream exits the compression unit 108 via conduit 110 as a high-pressure and optionally high-temperature ammonia stream (hereinafter, "high-pressure, high-temperature ammonia stream"), and the conduit 110 then feeds the high-pressure, high-temperature ammonia stream to the reactor 104.

The reactor 104 is also configured to receive a supercritical water stream via conduit 112. In the reactor 104, the high-pressure, high-temperature ammonia stream is mixed with the supercritical water stream and the oil stream. The reactor 104 is operated in supercritical water conditions. In one or more embodiments, the reactor 104 is operated in a pressure range of 220 bar to 500 bar and in a temperature range of approximately 380° C. to 800° C. In the reactor 104, the supercritical water stream contacts the oil stream in the reactor 104, thereby upgrading the oil stream. The high-pressure, high-temperature ammonia stream reacts with sulfur radicals generated during the upgrading of the oil stream, as well as with sulfur and sulfur compounds present in the oil stream. The reactions of the high-pressure, high-temperature ammonia stream with sulfur compounds of the oil stream in the reactor 104 produce ammonia-sulfur compounds such as ammonium sulfite, ammonium sulfate, ammonium thiosulfate, and ammonium hydrosulfide, for example. As such, the reactions in reactor 104 of the high-pressure, high-temperature ammonia stream with the sulfur compounds of the oil stream result in the desulfurization of the oil stream.

In one or more embodiments, the reactor 104 can be operated in a first operating mode or a second operating mode. In the first operating mode, the reactor 104 is operated in a pressure range of approximately 220 bar to 500 bar and in a temperature range of approximately 380° C. to 550° C. In this first operating mode, limited or no ammonia decomposition occurs in the reactor 104. In the second operating mode, the reactor 104 is operated in a pressure range of approximately 220 bar to 500 bar and in a temperature range of approximately 550° C. to 800° C. In this second operating mode, ammonia decomposition occurs in the reactor 104. In at least one embodiment, the reactor 104 comprises two sections, one section for operating in the first operating mode and another section for operating in the second operating mode. These two sections can be operated in series or, alternatively, in parallel.

In one or more, embodiments, the reactor 104 can also be operated with or without a catalyst. In one or more embodiments, a portion of the reactor 104 can operate with a catalyst while another portion of the reactor 104 operates without a catalyst. In such an embodiment, the reactor 104 can comprise a first thermal oxidation section and a second thermal oxidation section. The first thermal oxidation section is configured to operate without a catalyst and in a temperature range of approximately 380° C. to 600° C. The second thermal oxidation section is configured to operate with a catalyst and in a temperature range of approximately 300° C. to 600° C. in sub-critical or supercritical conditions. In one or more embodiments, the first thermal oxidation section and second thermal oxidation section are operated in series. As such, the catalyst in the second thermal oxidation section is used to increase the conversion rate of reactions in the second thermal oxidation section. In one or more embodiments, supercritical oxidation in the first thermal oxidation section can occur above the water critical temperature (approximately 374° C.). In one or more embodiments, oxidation in the second thermal oxidation section in the presence of the catalyst can occur at subcritical conditions (less than 374° C.). For instance, in at least one embodiment, oxidation in the second thermal oxidation section in the presence of the catalyst can occur at a temperature as low as 300° C. In embodiments that include the first and second thermal oxidation sections, catalyst usage is reduced, and the catalysts is used primarily for assisting in the oxidation of the species exiting the first thermal oxidation section that are generally difficult to oxidize, including ammonia and certain ammonia-based compounds.

In at least one embodiment, an oxidant stream can also be fed to the reactor 104 via conduit 114. The oxidant stream can enhance the oxidation and upgrading of the oil stream in the reactor 104. The oxidant stream can also enhance the oxidization of sulfur compounds in the oil stream and the ammonia-sulfur compounds formed in the reactor 104, which have not been fully oxidized. Oxidation of the ammonia-sulfur compounds with the oxidant stream can generate ammonia sulfate, for example, which can be a valuable by-product of the system 100. The oxidant stream can comprise one of several oxidants. Specifically, in one or more embodiments, the oxidant stream 114 can comprise ozone, oxygen, $H_2O_2$, or oxygenated organic components. The organic components can be alcohols, acids, or ketones, for example.

In embodiments in which the reactor 104 comprises two sections in series, the oxidant stream can be introduced into the second section in order to minimize its impact on supercritical water reactions with the oil stream, and instead to target the oxidation of the formed ammonia-sulfur components. In such an embodiment, supercritical water and the oil stream are introduced into the first section of the reactor 104. In one or more embodiments, the oxidant stream can be in the range of approximately 0.05 to 10 times the molar flow of the sulfur content in the oil stream 102. In at least one embodiment, the oxidant stream can be in the range of approximately 0.1 and 1 times the molar flow of the sulfur content in the oil stream.

After the reactions in the reactor 104, the components of the upgraded oil stream, the ammonia stream, and the supercritical water stream form a mixture stream that is fed from the reactor 104 via conduit 116 to a phase separator 118. The mixture stream can also include ammonia-sulfur compounds formed in the reactor 104 as well as unreacted ammonia of the ammonia stream. The phase separator 118 is configured to separate out any non-dissolved components from the mixture stream. For example, in one or more embodiments in the phase separator 118, the non-dissolved components in the oil phase or the supercritical water phase of the mixture stream can precipitate out of the mixture stream. In one or more embodiments, the phase separator can comprise a cyclone, centrifuge type of equipment, a regenerative filter, or other technology known in the art for phase separation.

The non-dissolved components are separated mixture stream and exit the phase separator 118 via conduit 120. The remaining components of the mixture stream is transferred via conduit 122 to an expansion device 124. The expansion device 124 is configured to reduce the pressure of the mixture stream below a water critical pressure (approximately 221 bar) to produce a low-pressure mixture stream. The low-pressure mixture stream has a pressure in the range of approximately 0.1 bar to 200 bar. In at least one embodiment, the low-pressure mixture stream has a pressure in the range of approximately 1 bar to 20 bar.

The expansion device 124 can be a static device like a throttle valve or a rotating device such as a turbine. The expansion device 124 can include either expansion valves or expansion turbines or a combination of expansion valves and expansion turbines. In embodiments in which the expansion device 124 is inclusive of expansion turbines, the expansion turbines can be mechanically linked to compression pumps of ammonia compression unit 106 and/or to compression unit 148.

The low-pressure mixture stream exits the expansion device 124 via conduit 126, which feeds the low-pressure mixture to a cooling unit 128. The cooling unit 128 is configured to reduce the temperature of the low-pressure mixture to cold sink temperature or ambient temperature, thereby creating a low-pressure, low-temperature mixture stream. In one or more embodiments, the cooling unit 128 can be configured to reduce the temperature of the low-pressure mixture to a temperature in the range of 2° C.-80° C. In one or more embodiments, the cooling unit 128 can comprise one or more internal heat exchangers that are utilized in the reduction of the temperature of the low-pressure mixture. The internal heat exchangers can include thermal linkages as discussed in further detail below.

The low-pressure, low-temperature mixture stream exits the cooling unit 128 via conduit 130, which then transfers the low-pressure, low-temperature mixture stream to a first separation unit 132. The first separation unit is configured to separate the low-pressure, low-temperature mixture stream into: 1) a hydrocarbon-rich gaseous phase; 2) a water stream containing ammonia, ammonia-sulfur compounds, and dissolved or suspended hydrocarbons; and 3) a treated oil stream. The hydrocarbon-rich gaseous phase is rich in light hydrocarbons. The hydrocarbon-rich gaseous phase exits the first separation unit 132 via conduit 134, which can route the hydrocarbon-rich gaseous phase for further processing, such as usages in another separation process. The hydrocarbon-rich gaseous phase is separated from the liquids in the first separation unit 132 based on vapor/liquid separation techniques as known in the art. The treated oil stream exits the first separation unit 132 via conduit 136. Similarly, the water stream containing ammonia, ammonia-sulfur compounds and dissolved or suspended hydrocarbons exits the first separation unit 132 via conduit 138. In one or more embodiments, the treated oil and water are separated in the first separation unit 132 based on liquid-liquid separation technologies known in the art such as density driven techniques or liquid-liquid extraction techniques.

Conduit 138 transfers the water stream from the first separation unit 132 to a second separation unit 140, which is configured to separate the dissolved or suspended hydrocarbons from the water. In one or more embodiments, the second separation unit 140 is designed to remove the residual oil from the water stream using technologies such as gravity, centrifugal, hydro-cyclone, flotation, mechanical or any other technology known in the art. The separated hydrocarbons exit the second separation unit 140 via conduit 142. In one or more embodiments, the second separation unit 140 is also configured to separate out the ammonia and ammonia-sulfur compounds from the water stream. The ammonia and ammonia-sulfur compounds exit the second separation unit 140 via conduit 144. In at least one embodiment, the second separation unit 140 comprises a crystallizer section that is configured to crystallize and precipitate the ammonia and ammonia-sulfur compounds out from the water stream to facilitate separation. In at least one embodiment, the ammonia and ammonia-sulfur compounds can also be separated from the water stream via centrifugation or other means known in the art. In at least one embodiment, the ammonia and ammonia-sulfur compounds that exit the second separation unit 140 via conduit 144 can be fed to a dryer or other processing unit for packaging or disposing of the ammonia-sulfur compounds.

The remaining water stream in the second separation unit 140 then exits the second separation unit 140 via conduit 146. In one or more embodiments, conduit 146 then transfers the water stream to a water compression unit 148. In one or more embodiments, the water compression unit 148 can also receive a make-up water stream from conduit 150. The water compression unit 148 can include a mixing device that is configured to mix the water stream and the make-up water stream to form a combined water stream. In one or more embodiments, the water compression unit 148 can also include heating equipment to increase the temperature of the combined water stream. In one or more embodiments, the water compression unit 148 can further include a compression device (e.g., one or more pumps, a turbo pump), which can be arranged in series or in parallel, for example, in order to increase the pressure of the combined water stream. As such, the water compression unit 148 is configured to compress and heat the combined water stream to form a supercritical water stream. Water is considered to reach supercritical conditions at a temperature of greater than approximately 374° C. and a pressure of greater than approximately 221 bar. The supercritical water stream then exits the water compression unit 148 via conduit 112, which transfers the supercritical water stream to the reactor 104 to start a new cycle.

In at least one embodiment, the cooling unit 128 can include internal heat exchangers and have thermal linkages 152, 154 with one or both of the water compression unit 148 and the ammonia compression unit 108, which transfer heat from the cooling unit 128 to the water compression unit 148 and/or ammonia compression unit 108. As such, the internal heat exchangers and thermal linkages reduce the external energy required to heat the water in the water compression unit 148 and the ammonia in the ammonia compression unit 108.

FIG. 2 shows a high-level diagram illustrating a system 200 for upgrading an oil stream in accordance with one or more embodiments. The system 200 of FIG. 2 includes substantially the same units as provided in system 100, except system 200 does not include an ammonia compression unit 108. As such, rather than separate ammonia and supercritical water streams that enter the reactor 104, system 200 includes a single feed for providing both supercritical water and ammonium hydroxide to the reactor 104.

Specifically, with reference to FIG. 2, in system 200 ammonia is fed initially with water to the compression unit 248 via conduit 250. In at least one embodiment, the water fed with the ammonia via conduit 250 is supercritical water. In one or more embodiments, the water fed with the ammonia via conduit 250 is not at a supercritical temperature and pressure for water, and the compression unit 248 is configured to increase the pressure and temperature of the water such that it is reaches supercritical conditions. In one or more embodiments, the feed of water and ammonia via conduit 250 into the compression unit 248 has a molar flow rate of ammonia in the range of 0.05 to 20 times the molar flow rate of the sulfur present in the oil stream that enters the reactor 104 via conduit 102. In at least one embodiment, the feed of water and ammonia via conduit 250 into the compression unit 248 has a molar flow rate of ammonia in the range of 0.2 to 2 times the molar flow rate of the sulfur present in the oil stream that enters the reactor 104 via conduit 102.

The compression unit 248 operates in substantially the same fashion as compression unit 148 of system 100 as described previously, except that the compression unit 248 mixes the ammonia with the supercritical water. In one or more embodiments, the compression unit 248 also increases the pressure and optionally the temperature of the mixture of water and ammonia. The supercritical mixture of water and ammonia is then transferred to the reactor 104 via conduit 252. The mixture of ammonia and supercritical water is brought into intimate contact with the oil stream in the reactor 104 at a first thermal oxidation section of the reactor 104. This is in contrast with certain embodiments of system 100, in which ammonia is supplied via conduit 110 and can be injected into the reactor 104 at various locations, such as in the middle of the reactor 104 or near the exit of the reactor 104 (i.e., conduit 116), during or after upgrading of the supercritical water and desulfurization.

Accordingly, as discussed herein, the present systems and methods for upgrading an oil stream enables ammonia to react with different radicals generated in the reactor, along with oxidation of the different compounds in the oil stream to generated ammonia-based compounds, and especially ammonia-sulfur compounds. This generation of ammonia-sulfur compounds allows for additional in-situ desulfurization of the oil stream, while the supercritical water and oxidant simultaneously upgrades, oxidizes and desulfurize the oil stream. As such, the present systems and methods provide an integrated process for upgrading, oxidizing, and desulfurizing an oil stream (e.g., crude oil), which provides energy savings as compared with conventional methods in which upgrading, oxidation, and desulfurization are completed using separate and costly systems.

Although much of the foregoing description has been directed to systems and methods for upgrading oil streams, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for upgrading an oil stream, the method comprising:
   combining, in a reactor, the oil stream, an ammonia stream, and a supercritical water stream to form a mixture stream, wherein the supercritical water stream contacts the oil stream in the reactor, thereby upgrading the oil stream, and wherein the ammonia stream reacts with sulfur initially present in the oil stream to produce ammonia-sulfur compounds;
   separating, in a phase separator, non-dissolved components from the mixture stream;
   expanding, in an expansion device, the mixture stream, wherein expansion of the mixture stream reduces the pressure of the mixture stream below a water critical pressure to produce a low-pressure mixture stream;
   cooling, in a cooling unit, the low-pressure mixture stream to create a low-pressure, low-temperature mixture stream;
   separating, in a first separation unit, the low-pressure, low-temperature mixture stream into a hydrocarbon-rich gaseous phase, a water stream containing ammonia-sulfur compounds, and a treated oil stream; and
   separating, in a second separation unit, the ammonia-sulfur compounds from the water stream.

2. The method of claim 1, wherein the step of separating in the second separation unit comprises:
   crystallizing, via a crystallizer in the second separation unit, the ammonia-sulfur compounds; and
   separating the ammonia-sulfur compounds from the water stream via precipitation or centrifugation.

3. The method of claim 1, wherein the reactor is operated in a first mode at pressure of approximately 220 bar to 500 bar and a temperature of approximately 380° C. to 550° C. such that there is no ammonia decomposition or minimal ammonia decomposition in the reactor.

4. The method of claim 1, wherein the reactor is operated in a second mode at pressure of approximately 220 bar to 500 bar and a temperature of approximately 550° C. to 800° C. such that ammonium decomposition occurs in the reactor.

5. The method of claim 1, further comprising:
   heating, in a heating unit, the ammonia stream prior to delivery of the ammonia stream to the reactor.

6. The method of claim 1, further comprising:
   mixing, in a compression unit, the water stream received from the second separation unit with a make-up water stream to form a combined water stream;
   compressing and heating, in the compression unit, the combined water stream to form the supercritical water stream; and
   transferring the supercritical water stream to the reactor.

7. The method of claim 1, further comprising:
   injecting, into the reactor, an oxidant stream and wherein the oxidant stream oxidizes a portion of the sulfur in the oil stream and a portion of the ammonia-sulfur compounds and wherein the oxidant stream enhances the upgrading of the oil stream.

8. The method of claim 7, wherein the oxidant stream comprises at least one of ozone, oxygen, and $H_2O_2$.

9. The method of claim 1, wherein the reactor has a first thermal oxidation section and a second thermal oxidation section operated in series, and wherein the method further comprises:
   injecting a catalyst into the second thermal oxidation section.

10. The method of claim 1, wherein the oil stream comprises crude oil.

* * * * *